Figure 1:
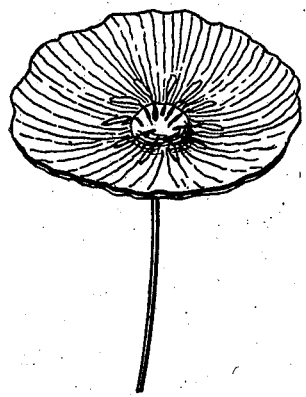

No. 894,449.  
C. H. LAND.  
PATENTED JULY 28, 1908.

MOLDABLE MASS OR COMPOUND ARTICLES OF MANUFACTURE FORMED THEREFROM AND THE PROCESS OF FORMING SAID ARTICLES OF MANUFACTURE.

APPLICATION FILED SEPT. 11, 1907.

Witnesses  
O. B. Braenziger  
E. M. Spielbing

Inventor  
Charles H. Land  
By Newell S. Wright  
Attorney

UNITED STATES PATENT OFFICE.

CHARLES H. LAND, OF DETROIT, MICHIGAN.

MOLDABLE MASS OR COMPOUND ARTICLES OF MANUFACTURE FORMED THEREFROM AND THE PROCESS OF FORMING SAID ARTICLES OF MANUFACTURE.

No. 894,449.　　　　Specification of Letters Patent.　　　Patented July 28, 1908.

Application filed September 11, 1907. Serial No. 392,278.

To all whom it may concern:

Be it known that I, CHARLES H. LAND, a citizen of the United States, residing at Detroit, in the county of Wayne and State of Michigan, have invented certain new and useful improvements in a moldable mass or compound articles of manufacture formed therefrom and the process of forming said articles of manufacture, of which the following is a specification.

My invention relates to a new plastic or moldable compound for use in ceramic manufacture, together with articles of manufacture formed therefrom, as well as to the process of forming various articles of manufacture from said plastic compound or moldable mass.

My invention relates primarily to a new binding material adapted to hold together grains of vitreous masses, such, for example, as kaolin, silica, carborundum, porcelain, clay, pottery materials, and analogous substances, while being molded, and the use of said binding material to retain the molded mass in shape while being fired. The basis of my binding material is gum chicle. This may be diluted with chloroform or other solvent or thinner, or the gum chicle may be mechanically mixed by heat at a sufficient degree of temperature, as for example, about 80 degrees Fahrenheit. Next this gum chicle is mixed with any kind of body material which is adapted to be fire-hardened, and then the mass, at a temperature of about eighty degrees, is shaped and later fired. For example, to obtain a pure silica muffle, I may mix ninety pounds of pure silica with ten pounds of gum chicle, shape the mass at a temperature of about eighty degrees Fahrenheit, and then fire the article at an appropriate temperature, viz., about three thousand degrees Fahrenheit. I have found that it is unnecessary to let the plastic mass harden before firing.

My invention embodies the process of forming various articles of manufacture by means of such a moldable mass, and articles of manufacture so formed. The process may even be continuous by impression in the molds, by expelling the plastic mass through a die, and passing it through a furnace, without any interruption.

In casting articles having delicate details, such as castings made of flowers, I find it advisable to add a thinner, as for example, a small percentage of chloroform or other solvent to the gum chicle. This will enable the plastic mass to be pressed into the finest detail structures without distorting them from their true form.

In the course of my experiments, I have discovered that gum chicle has a remarkable property of holding pure silica, as well as other substances, in exact definite forms through the highest degrees of temperature. I have also discovered that a compound so formed is not adhesive to the molds. The mass or body having the gum chicle mixed therewith may be put up as a marketable compound ready for use, as silica having the gum chicle mixed in proper proportions therewith.

It is obvious that my invention is much broader than the instances I have given of its application. Thus by suitable choice of ingredients and coloring matter, I may be able to make abrading disks, permanent specimens of mushroom forms, in natural tints, decorated porcelain ware, cameos, intaglios, lamp chimneys, bottles, etc. The remarkable property of the products of my invention is that they absolutely retain their natural size and form, without the shrinkage so often found in many fire hardened products.

It is obvious that the silica is held together in the finished article by the fusing process, the finished article having been subjected to a sufficient temperature. The gum chicle serves as a binder to hold the material together until it has combined by subjection to a sufficiently high degree of temperature. The gum chicle serves as a temporary binder until the silica or analogous material is formed into a solid or homogeneous mass by being fire hardened, or subjected to a sufficient degree of temperature. In this plastic condition the compound may be compressed into any desired mold and cast rapidly therefrom.

Figure 2:
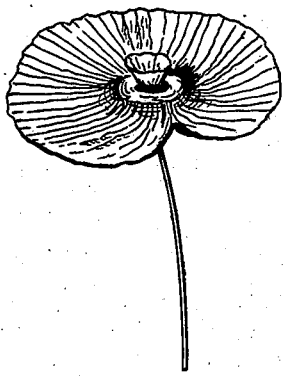
Figure 4:
Figure 5:
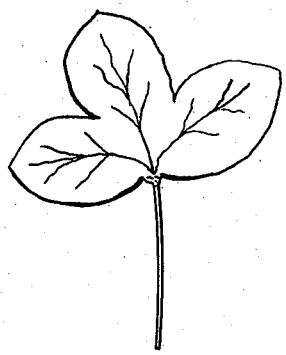
Figure 3:
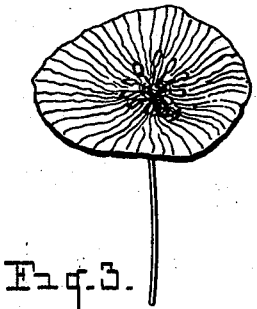
Figure 6:

In the drawings submitted herewith in illustration of my invention: Figure 1 illustrates an artificial article formed from carborundum and gum chicle combined. Fig. 2 illustrates an article formed of porcelain and gum chicle combined. Fig. 3 illustrates still another article formed of porcelain and gum chicle. Fig. 4 is a view in section through the article illustrated in Fig. 1. Fig. 5 illustrates an artificial lead formed from a mass such as described, an ordinary leaf serving as a mold. In Fig. 6 is illustrated a casting made from any ordinary name plate.

It will be understood that the drawings simply serve to illustrate my invention.

What, therefore, I desire to secure by Letters Patent of the United States is:

1. The herein described composition comprising gum chicle and a body adapted to be fire hardened.

2. The herein described composition comprising gum chicle and a ceramic body.

3. The herein described composition comprising gum chicle and a silica body.

4. The herein described composition comprising gum chicle, a thinner, and a ceramic body.

5. The herein described composition comprising gum chicle, chloroform, and a ceramic body.

6. The herein described composition comprising gum chicle and a vitreous body.

7. The process of forming an article of manufacture consisting of mixing a vitreous body with gum chicle, and fire hardening the mass.

8. The process of manufacturing articles of manufacture consisting of mixing a vitreous substance with gum chicle to form a composition of matter, molding the composition to desired form, and then fire-hardening the molded mass.

9. The process of manufacturing articles of manufacture consisting of mixing a vitreous substance with gum chicle to form a composition of matter, softening said composition, molding the composition to desired form, and then fire-hardening the molded mass.

In testimony whereof I have signed this specification in presence of two witnesses.

CHARLES H. LAND.

Witnesses:
N. S. WRIGHT,
E. M. SPIELBURG.